Patented Nov. 25, 1930

1,782,932

UNITED STATES PATENT OFFICE

ROBERT B. McCARTY, OF PORT ARTHUR, TEXAS, ASSIGNOR TO GULF REFINING COMPANY, OF PITTSBURGH, PENNSYLVANIA, A CORPORATION OF TEXAS

LUTE

No Drawing.    Application filed September 6, 1927. Serial No. 217,882.

This invention relates to lutes; and it comprises a luting or cementing composition applicable for use with ceramic materials at high temperatures and particularly in apparatus handling free chlorin, said lute being composed of fine ground burnt clayey material made into a plastic mass with a strong solution of caustic soda or caustic potash; said clayey material being advantageously one which has been exposed to chlorin and thereby freed of easily chloridizable material; a desirable composition consisting of about 65 per cent ground material of the character described and about 35 per cent of 40° Bé. solution of caustic soda; all as more fully hereinafter set forth and as claimed.

In luting, cementing and repairing fireclay apparatus used in high temperature operations, and particularly with apparatus used in operations involving the presence of free chlorin, it is desirable to provide a freely plastic material which will dry down in place without much change in volume and will be converted by high heat into a non-reactive solid cohering body not readily attacked by chlorin. Such a material is particularly desirable in repairing apparatus used in the manufacture of aluminum chlorid where a lute or cement, like the apparatus itself, must resist the action of chlorin and of aluminum chlorid vapors at high temperature for a reasonable time.

I have found a composition having the described properties and applicable for the described purposes can be provided by moistening fine ground burnt fireclay, such as is used for firebrick with a strong solution of caustic soda. While other burnt clayey materials may be used I find burnt fireclay best. It should be as free as possible of constituents readily chlorinated, and for this reason I find it advantageous to use old bricks or other elements taken from apparatus used in making aluminum chlorid; these having lost all constituents readily chlorinated. Chambers used for making aluminum chlorid are ordinarily lined with firebrick and this firebrick undergoes certain changes in operation. There is a progressive loss in weight with removal of iron and other constituents. The final result is a material which is practically a pure aluminum silicate. In the usual types of apparatus a lining is used for about 40 days before replacement. At this time it has lost about 75 per cent of the original weight and is a chalk white material which contains substantially nothing but aluminum silicate. This residual aluminum silicate is, comparatively, highly resistant to chlorin and is the best material I have found for use in making the present composition.

The burnt clay used, whether it be these old lining materials, or new firebrick, etc. should be ground to a fineness such that 90 per cent will go through a 50 mesh screen. While other strengths of caustic soda solution may be used, I find a 49° Bé. solution to be most applicable. Caustic potash may be used instead of caustic soda with the same advantages. A good ratio for the composition is about 65 per cent fine ground residual linings or well burnt firebrick and 35 per cent (by weight) of caustic soda solution of 40° Bé. These are mixed thoroughly to form a plastic mass which is then ready for use. A composition made as just described becomes hard at atmospheric temperature although not thoroughly bonded, but it has sufficient strength to give good coherence and enable handling. This mix used as a lute between the firebrick, after air drying and calcining at about 1690° F. gives a thoroughly good bond between the bricks. On breaking the cemented bricks the break occurs across the joints rather than with the joints. In a laboratory test the semented bricks on exposure to chlorin at a high temperature for 36 hours showed no sign of injury or of reaction with the gas. The use of this lute in the commercial manufacture of aluminum chlorid shows it to be more resistant to hot chlorin and other corrosive gases than any other lute with which I am familiar. A lute made from ground old linings, arch brick etc. of an aluminum chlorid apparatus is substantially better than one made with unused firebrick. Other proportions of burnt fireclay, NaOH and water, give good results; but not as good as the proportions mentioned.

The present composition hardens in the air at ordinary temperatures, and at all temperatures thereabove up to 2400° F. when vitrifaction takes place. Fire bonding is best at about 1690° F. although temperatures up to 2000° F. may be used.

The present luting material may be used in the construction of kilns, retorts and furnaces for withstanding corrosive chemical reactions either at high temperatures or at low temperatures; and it may be used as a jointing material for laying of bricks and other refractory materials. It is also applicable as a lining material for retorts and the like.

One of the most valuable properties of the present luting material is the extremely strong cohesive union it forms with ceramic materials. Its resistance to hot chlorin is a particularly valuable feature. As stated, this resistance is noticeably higher with material which has been, so to speak, pretreated with chlorin.

What I claim is:—

1. As a new luting materal a mixture of fine ground burnt clay and strong caustc solution in about the proportions of 65 per cent ground burnt clay and 35 per cent 40° Bé. caustic soda solution.

2. As a new luting material adapted to withstand the action of chlorin at a high temperature, a plastic mixture of fine ground burnt ceramic material taken from an aluminum chlorid apparatus and consisting substantially of pure aluminum silicate with a solution of caustic soda.

In testimony whereof, I have hereunto affixed my signature.

ROBERT B. McCARTY.